United States Patent [19]
Satoh et al.

[11] Patent Number: 5,520,847
[45] Date of Patent: May 28, 1996

[54] LOW-VELOCITY ELECTRON EXCITED PHOSPHOR

[75] Inventors: Yoshitaka Satoh; Hitoshi Toki; Fumiaki Kataoka; Shigeo Itoh, all of Mobara, Japan

[73] Assignee: Futaba Denshi Kogyo K.K., Chiba-ken, Japan

[21] Appl. No.: 247,994

[22] Filed: May 24, 1994

[30] Foreign Application Priority Data

Jun. 2, 1993 [JP] Japan .................................. 5-131839

[51] Int. Cl.$^6$ .............................. C09K 11/57; C09K 11/54
[52] U.S. Cl. ............................ 252/301.6 R; 252/301.4 R; 106/425
[58] Field of Search ................... 252/301.6 R, 301.4 R; 106/425

[56] References Cited

U.S. PATENT DOCUMENTS 3,723,339  3/1973  Wanmaker et al. ............. 252/301.6 R

FOREIGN PATENT DOCUMENTS 48-43036  12/1973  Japan.

Primary Examiner—Melissa Bonner
Attorney, Agent, or Firm—Fisher & Associates

[57] ABSTRACT

A low-velocity electron excited phosphor having a composition represented by a general formula $ZnO \cdot (Al_x, Ga_{1-x})_2O_3:Mn$, wherein $X=0.001$ to $0.3$ mol. A content of Al in the phosphor is set be to within a range between 0.001 mol and 0.3 mol. The range permits a variation in luminance of the phosphor to be within $\pm 30\%$ and initial luminance of the phosphor to be significantly increased, resulting in the phosphor being suitable for use for a fluorescent display device.

1 Claim, 3 Drawing Sheets

LOW-VELOCITY ELECTRON EXCITED PHOSPHOR

BACKGROUND OF THE INVENTION

This invention relates to a low-velocity electron excited phosphor, and more particularly to a phosphor which is excited by low-velocity electrons to emit a green luminous color and suitable for use for a fluorescent display device.

Japanese Patent Application Laid-Open Publication No. 149772/1976 discloses a low-velocity electron excited phosphor having a composition represented by the following general formula:

$$A(Zn_{1-x}Mg_x)O \cdot Ga_2O_3:BMn$$

wherein $6 \leq A \leq 1.2$, $0 \leq B \leq 5 \times 10^{-2}$ and $0 \leq x \leq 1.0$.

The phosphor disclosed is prepared by adding Mn and Mg to a phosphor body or matrix of a blue luminous color represented by a formula $ZnO \cdot Ga_2O_3$.

FIG. 3 shows luminance life characteristics of phosphors including a phosphor of the present invention depending on a content of Al therein. In FIG. 3, a curve of X=0 indicates a relationship between relative luminance and operating time in a fluorescent display device including a $ZnO \cdot Ga_2O_3$:Mn phosphor. The phosphor has a composition represented by the above-described formula wherein x=0.

As indicated by the curve of X=0 in FIG. 3, the phosphor is increased in luminance until about 3000 hours elapse after an initial stage of excitation of the phosphor and kept substantially unchanged thereafter, In general, a plurality of display segments arranged in a fluorescent display device are varied in frequency of excitations in use. Therefore, use of a phosphor exhibiting such luminance characteristics as described above for display segments of a fluorescent display device causes a difference in luminance to occur with time between the display segments subject to long-period excitation and those subject to short-period excitation in the same fluorescent display device, resulting in quality of a luminous display of the device being substantially deteriorated with time.

SUMMARY OF THE INVENTION

The present invention has been made in view of the foregoing disadvantage of the prior art.

Accordingly, it is an object of the present invention to provide a low-velocity electron excited phosphor of a green luminous color which is capable of exhibiting increased initial luminance and reducing a variation in luminance depending on an operating period.

In accordance with the present invention, a low-velocity electron excited phosphor is provided. The low-velocity electron excited phosphor has a composition represented by the general formula:

$$ZnO \cdot (Al_x Ga_{1-x})_2O_3:Mn$$

wherein X=0.001 to 0.3 mol.

The phosphor of the present invention constructed as described above exhibits a green luminous color when it is excited by low-velocity electrons. The phosphor exhibits increased initial luminance and stabilized luminance over a long period of operating time.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a phosphor according to the present invention will be described hereinafter with reference to the accompanying drawings.

Figure 1:
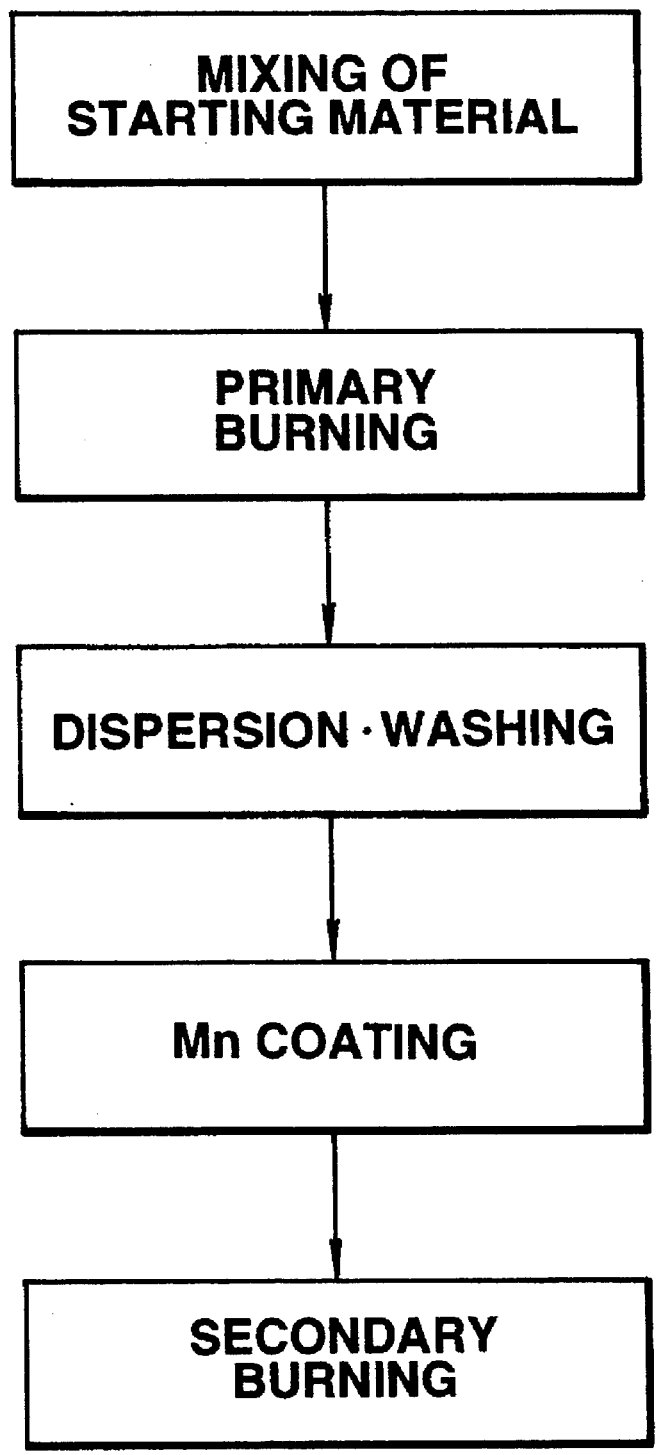
FIG. 1 is a flow chart showing a process for preparing a low-velocity electron excited phosphor according to the present invention.

First, a process for preparing a phosphor of the present invention will be described with reference to FIG. 1.

Mixing of Starting Material:

First, ZnO, $Al_2O_3$ and $Ga_2O_3$ which constitute a starting material for a matrix of a phosphor of the present invention are mixed with each other at each of ratios shown in TABLE 1.

TABLE 1

| Al Content | ZnO (g) | $Al_2O_3$ (g) | $Ga_2O_3$ (g) |
|---|---|---|---|
| 0.0005 | 7.3–8.1 | 0.005 | 18.7 |
| 0.001 | 7.3–8.1 | 0.01 | 18.7 |
| 0.01 | 7.3–8.1 | 0.10 | 18.6 |
| 0.05 | 7.3–8.1 | 0.51 | 17.8 |
| 0.1 | 7.3–8.1 | 1.02 | 16.9 |
| 0.2 | 7.3–8.1 | 2.04 | 15.0 |
| 0.3 | 7.3–8.1 | 3.06 | 13.1 |
| 0.5 | 7.3–8.1 | 5.10 | 9.4 |

Also, any one of fluxes shown in TABLE 2 is mixed with the starting material.

TABLE 2

| Flux (mol %/mol) | NaCl (g) | NaF (g) | KCl (g) | KF (g) |
|---|---|---|---|---|
| 10 | 0.584 | 0.420 | 0,746 | 0.581 |
| 20 | 1.17 | 0.840 | 1.49 | 1.16 |
| 30 | 1.75 | 1.26 | 2.24 | 1.74 |
| 40 | 2.34 | 1.68 | 2.98 | 2.32 |

For this purpose, a halide of each of elements belonging to Group Ia in the periodic table such as NaCl, NaF, KCl, KF, RbCl or RbF, a carbonate of the element, a nitrate thereof, a hydroxide thereof, a sulfate thereof, or the like may be used for the flux. The flux may be mixed with the matrix at a ratio of 10 to 40 mol % per mol of the matrix.

The mixing may be fully carried out in either a dry way or a wet way. It is further desirable that the components for the starting material are mixed at a molecular level by coprecipitation or the like.

Primary Burning:

Then, the resultant mixture is placed in a heat-resistant vessel such as an alumina vessel or the like and then subject to primary burning at 1300° C. for 3 hours in an air atmosphere, resulting in the matrix of the phosphor being synthesized. When the preceding mixing is carried out by coprecipitation, the mixture is changed to oxides at a temperature as low as hundreds degrees C., followed by the primary burning.

Dispersion and Washing:

Agglomerated particles of the matrix burned are subject to crushing or breaking by means of a ball mill or the like. Then, the crushed matrix is washed with pure water to remove an excess of the flux.

Mn Coating:

Then, the matrix thus washed is coated with Mn. When Mn is in the form of a water soluble Mn compound such as $MnSO_4$, $MnCl_2$, $Mn(NO_3)_2$ or the like, it is used in the form of an aqueous solution thereof. When Mn is in the form of a compound less soluble to water, it is dissolved in 0.1 N HCl.

The matrix is mixed with pure water, resulting in being formed into a slurry, which is then mixed with a solution containing a predetermined amount of Mn compound, leading to formation of a mixture. Then, the mixture is subject to mixing and drying by means of a rotary evaporator or the like, so that the matrix may be coated with Mn. The amount of Mn mixed is set to be 0,005 to 0.1 mol as shown in TABLE 3.

TABLE 3

| Mn Content (atm/mol) | $MnSO_4$ (g) | $MnCl_2$ (g) | $Mn(NO_3)_2$ (g) |
| --- | --- | --- | --- |
| 0.005 | 0.076 | 0.063 | 0.09 |
| 0.01 | 0.15 | 0.13 | 0.18 |
| 0.02 | 0.30 | 0.25 | 0.36 |
| 0.05 | 0.76 | 0.63 | 0.90 |
| 0.1 | 1.51 | 1.26 | 1.79 |

As shown in TABLE 1, a content of ZnO in the starting material for the matrix is set to be in a range between 1 mol (8.1 g) and 0.9 mol (7.3 g). Mixing of the starting material carried out when the ZnO content is within the above-described range permits Mn to readily enter the matrix. The ZnO content below the above-described range causes the phosphor prepared to be decreased in luminance.

It is not necessarily required that the Mn coating uses Mn in the form of an aqueous solution. Mixing of Mn with the matrix in a dry way permits Mn to be effectively diffused into the matrix.

Secondary Burning:

Subsequently, the matrix coated or mixed with Mn is placed in an alumina boat and then subject to secondary burning at 1100° C. for 1 hour in a reducing atmosphere of $H_2/N_2=2/198$ (ml/min). This permits Mn to be diffused into the matrix, resulting in the matrix being activated. Then, the matrix is classified by means of a sieve, so that the phosphor of the present invention may be prepared.

The phosphor prepared according to the above-described procedure has a composition of ZnO $(Al_x, Ga_{1-x})_2O_3$:Mn wherein x=0.001 to 0.3 mol.

Various experiments on luminance of the so-prepared phosphor were made while using it for an anode display section of a fluorescent display device. The results were as shown in FIGS. 2 to 4.

Figure 2:
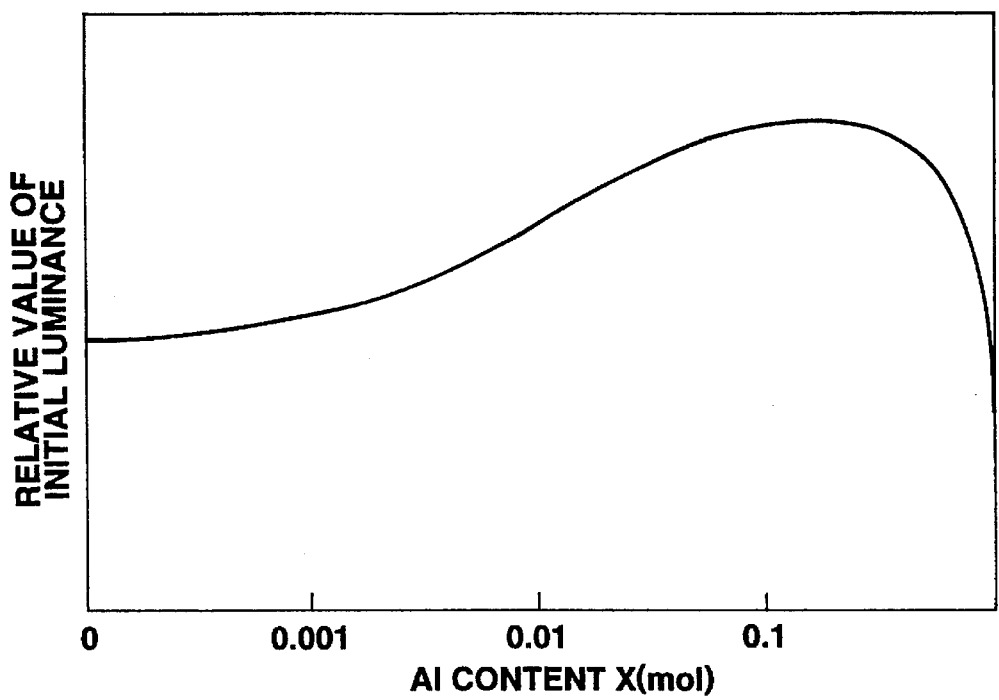
FIG. 2 is a graphical representation showing a relationship between a content of Al in each of phosphors including a phosphor of the present invention and initial luminance thereof.

FIG. 2 shows a relationship between a concentration (mol) of Al contained in the phosphor and a relative value of initial luminance of the phosphor. FIG. 2 indicates that a content of Al in the phosphor between about 0.001 mol and about 0.4 mol leads to an increase in luminance of the phosphor.

Figure 3:
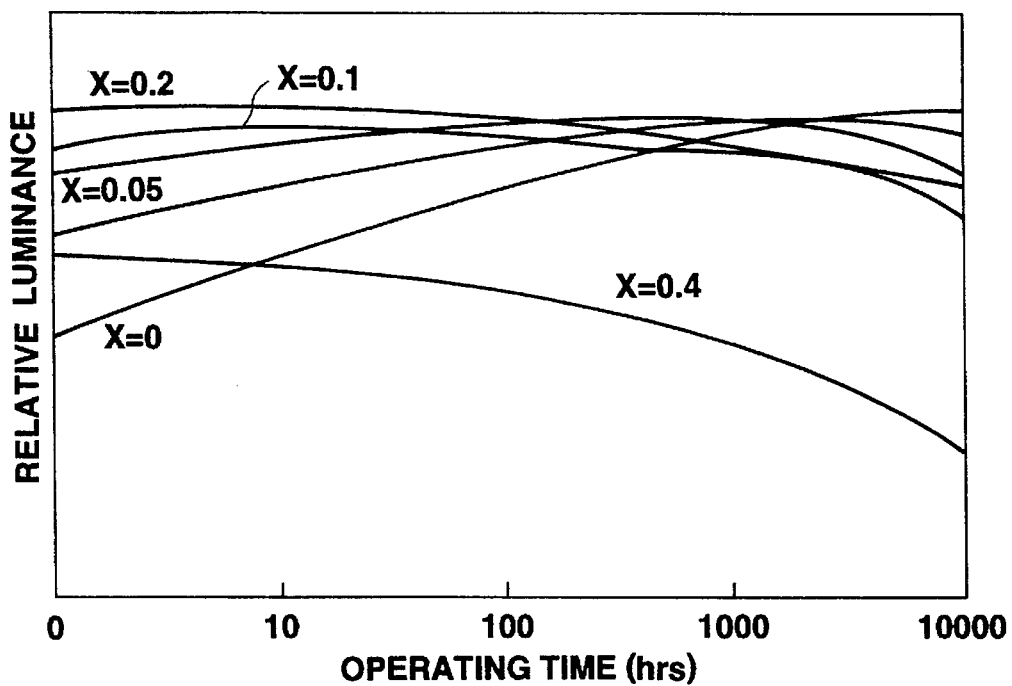
FIG. 3 is a graphical representation showing dependence of luminance life characteristics on a content of Al in each of phosphors including a phosphor of the present invention.
Figure 4:
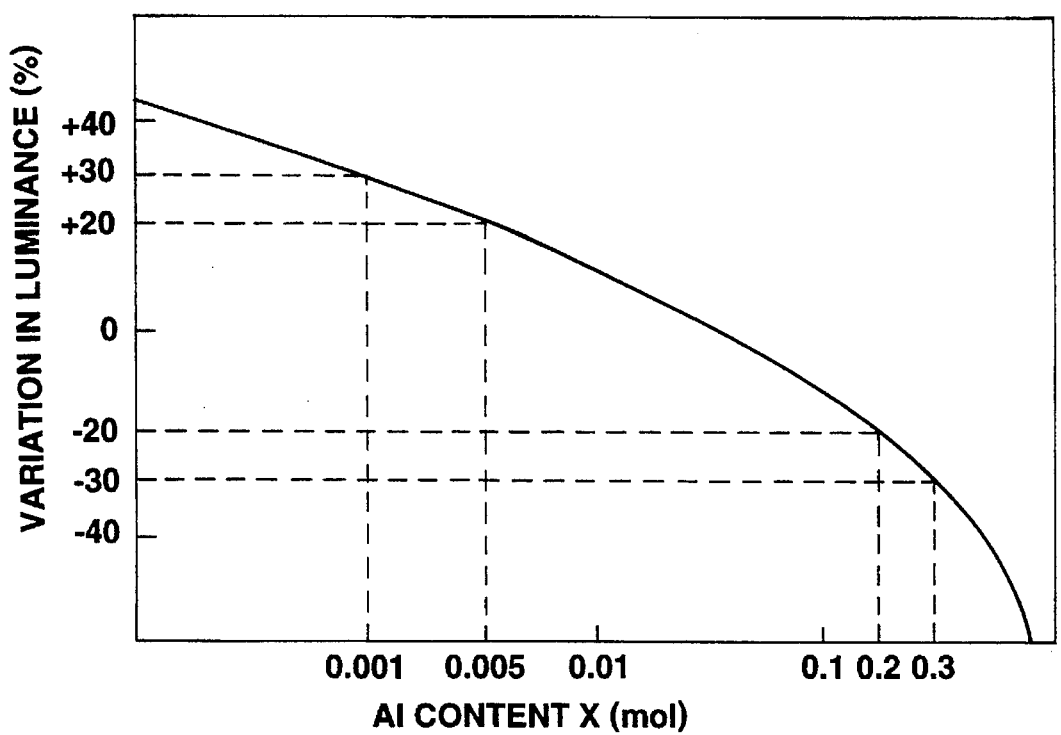
FIG. 4 is a graphical representation showing a relationship between a content of Al in each of phosphors including a phosphor of the present invention and a variation in luminance of the phosphor from an initial stage of excitation of the phosphor to lapse of 1000 hours in the excitation.

In FIG. 3, X indicates an Al content (mol) in the phosphor. FIG. 3 shows a relationship between relative luminance and an operating period in each of the phosphor of the present invention containing 0.001 to 0.3 mol of Al (X=0.05, 0.1 and 0.2), a phosphor containing Al in an amount exceeding the above-described Al content range defined in the present invention (X=0.4) and a conventional phosphor free of Al (X=0).

As is apparent from FIG. 3, the phosphor (X=0.05, 0.1) of the present invention tends to be somewhat increased in luminance until the operating period reaches 100 hours. Thereafter, the luminance of the phosphor remains on substantially the same level for a while. After lapse of thousands hours, it is somewhat decreased. Thus, it will be noted that the phosphor of the present invention exhibits highly stabilized luminance.

Also, the phosphor (X=0.2) of the present invention permits luminance to be kept substantially at a level of initial luminance until the operating period reaches tens hours. Then, the luminance decreases somewhat, however, this decrease in luminance does not adversely affect performance of a fluorescent display device at all.

The phosphor (X=0.4) of which an Al content is beyond the above-described range defined in the present invention is superior in initial luminance to the conventional phosphor free of Al. Nevertheless, the former is decreased in luminance as compared with the latter after lapse of 10 hours, followed by a rapid decrease in luminance. Thus, it will be noted that the former is not suitable for use for a fluorescent display device because of failing to exhibit stabilized luminance.

FIG. 4 shows a relationship between a content of Al in each of phosphors including a phosphor of the present invention and a variation in luminance of the phosphor between an initial stage of excitation of the phosphor and the excitation extending over 1000 hours. As is apparent from FIG. 4, a content of Al in the phosphor of the present invention is within a range between 0.001 mol and 0.3 mol. The range permits a variation in luminance of the phosphor to be within ±30%. Such variation does not adversely affect use of the phosphor for a fluorescent display device.

When a tolerance limit for the luminance variation is set to be ±20%, the phosphor of the present invention exhibits further stabilized luminance in a fluorescent display device, to thereby permit the device to carry out a display of high quality. For this purpose, the Al content may be set to be 0.005 mol and 0.2 mol.

Also, FIG. 4 indicates that the conventional phosphor free of Al is varied in luminance by +40%.

As can be seen from the foregoing, the low-velocity electron excited phosphor of the present invention is formed of the $ZnO·Ga_2O_3$:Mn or $ZnGa_2O_4$:Mn matrix to which a predetermined amount of Al is added. Thus, the phosphor of the present invention is increased in initial luminance and significantly reduces a variation in luminance depending on the operating period.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A low-velocity electron excited phosphor having a composition represented by the general formula:

$$ZnO \cdot (Al_x, Ga_{1-x})_2O_3:Mn$$

wherein X=0.2 mol.

* * * * *